US009016317B2

(12) United States Patent
Myrhum, Jr.

(10) Patent No.: US 9,016,317 B2
(45) Date of Patent: Apr. 28, 2015

(54) MULTI-OPERATIONAL VALVE

(71) Applicant: Milwaukee Electric Tool Corporation, Brookfield, WI (US)

(72) Inventor: James O. Myrhum, Jr., West Bend, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 13/955,653

(22) Filed: Jul. 31, 2013

(65) Prior Publication Data

US 2014/0034159 A1 Feb. 6, 2014

Related U.S. Application Data

(60) Provisional application No. 61/677,554, filed on Jul. 31, 2012, provisional application No. 61/792,356, filed on Mar. 15, 2013.

(51) Int. Cl.

*F16K 11/16* (2006.01)
*F16K 15/18* (2006.01)
*F16K 17/04* (2006.01)
*F16K 17/168* (2006.01)
*B25F 5/00* (2006.01)
*F15B 13/02* (2006.01)

(52) U.S. Cl.

CPC ............... *F16K 15/18* (2013.01); *F16K 17/048* (2013.01); *F16K 17/168* (2013.01); *B25F 5/005* (2013.01); *F15B 13/024* (2013.01); *F15B 2211/31511* (2013.01); *F15B 2211/324* (2013.01); *F15B 2211/50518* (2013.01)

(58) Field of Classification Search

CPC ............................... F16K 15/025; F16K 15/18
USPC ........ 137/522, 599.18, 601.2, 614.17, 630.22
See application file for complete search history.

(56) References Cited

U.S. PATENT DOCUMENTS 2,132,962 A 10/1938 Mueller
2,254,613 A 9/1941 Matthysse
2,353,488 A 7/1944 Mueller
2,568,982 A * 9/1951 McKay .................... 137/630.15
2,583,733 A 1/1952 Fischer et al.

(Continued)

OTHER PUBLICATIONS

International Search Report and Written Opinion for Application No. PCT/US2013/052970 dated Nov. 13, 2013 (13 pages).

(Continued)

*Primary Examiner* — John K Fristoe, Jr.
*Assistant Examiner* — Reinaldo Sanchez-Medina
(74) *Attorney, Agent, or Firm* — Michael Best & Friedrich LLP

(57) ABSTRACT

A valve for selectively fluidly communicating a first fluid volume and a second fluid volume includes a valve body, an inlet orifice in fluid communication with the first fluid volume, and an outlet aperture in fluid communication with the second fluid volume. The valve also includes an activation member axially movable relative to the valve body. The valve is operable in a first mode in which the valve opens in response to manual actuation of the activation member. The valve is operable in a second mode in which the valve opens when a pressure difference between the first and second fluid volumes reaches a predetermined value, and the valve closes when the pressure difference between the first and second fluid volumes is less than the predetermined value.

19 Claims, 7 Drawing Sheets

A 38 10 22 26 78 18 106 86 118 30 66 82 74 14 34 90 94 122 98 50 58 70 110 46 52 42 62 54 114

(56) References Cited

U.S. PATENT DOCUMENTS 2,782,855 A 2/1957 Marcoux
2,869,407 A 1/1959 Swanson
3,070,143 A 12/1962 Klinger
3,114,391 A * 12/1963 Kurtz ...................... 137/599.18
3,344,519 A 10/1967 Goodman
3,425,219 A 2/1969 Oliver et al.
3,564,716 A 2/1971 Burrows
3,602,103 A 8/1971 Powers
3,648,967 A 3/1972 O'Neill et al.
3,706,245 A 12/1972 Van Schaik
3,732,026 A 5/1973 Peters
3,924,330 A 12/1975 Mitsuhashi et al.
3,972,218 A 8/1976 Pawloski
4,010,630 A 3/1977 Davis, Jr. et al.
4,030,336 A 6/1977 Grigorenko et al.
4,031,619 A 6/1977 Gregory
4,082,104 A 4/1978 Keeney
4,086,802 A 5/1978 Ewig, Jr.
4,094,365 A 6/1978 Wanner
4,132,107 A 1/1979 Suganuma et al.
4,149,381 A 4/1979 Mekler
4,226,110 A 10/1980 Suganuma
4,239,058 A 12/1980 Peters
4,276,941 A 7/1981 Wanner et al.
4,292,833 A 10/1981 Lapp
4,305,423 A 12/1981 Adler
4,321,021 A 3/1982 Pauliukonis
4,334,667 A 6/1982 Fox
4,342,216 A 8/1982 Gregory
4,382,331 A 5/1983 Kimura
4,497,197 A 2/1985 Giardino et al.
4,571,975 A 2/1986 Pawloski et al.
4,581,894 A 4/1986 Bush et al.
4,597,263 A 7/1986 Corbett
4,667,411 A 5/1987 McCallum
4,689,957 A 9/1987 Gallentine
4,694,671 A 9/1987 Downham
4,703,623 A 11/1987 Dalibout et al.
4,766,750 A 8/1988 Brinkman
4,796,461 A 1/1989 Mead
4,844,114 A 7/1989 Moberg et al.
4,879,875 A 11/1989 Davert et al.
4,909,061 A 3/1990 Reitter et al.
4,922,615 A 5/1990 Nishida
4,942,757 A 7/1990 Pecora
4,947,672 A 8/1990 Pecora et al.
4,957,021 A 9/1990 Helton
4,998,351 A 3/1991 Hartmeister
5,150,644 A 9/1992 Kimura
5,159,872 A 11/1992 Dettmers et al.
5,195,354 A 3/1993 Yasui et al.
5,209,153 A 5/1993 Araki et al.
5,233,749 A 8/1993 Saito et al.
5,240,077 A 8/1993 Whitsitt
5,243,761 A 9/1993 Sullivan et al.
5,251,445 A 10/1993 Farell et al.
5,255,712 A * 10/1993 Foster .......................... 137/522
5,282,378 A 2/1994 Kimura
5,291,919 A 3/1994 Calzavara
5,365,736 A 11/1994 Yamamoto
5,375,638 A 12/1994 Green et al.
5,398,594 A 3/1995 Tischer et al.
5,425,164 A 6/1995 El Dessouky
5,474,242 A 12/1995 Rafn
5,477,680 A 12/1995 Heskey et al.
5,513,492 A 5/1996 Anderson
5,556,075 A 9/1996 Weber
5,598,635 A 2/1997 Saito
5,598,737 A 2/1997 Oide
5,630,277 A 5/1997 Kimura
5,647,212 A 7/1997 Coleman
5,666,848 A 9/1997 Burns
5,727,417 A 3/1998 Moffatt et al.
5,732,737 A 3/1998 Condon
5,744,934 A 4/1998 Wu
5,775,104 A 7/1998 Gardner
5,802,850 A 9/1998 Kimura
5,875,629 A 3/1999 Kimura
5,974,926 A 11/1999 Kimura
5,988,989 A 11/1999 Hobson
6,029,448 A 2/2000 Hobson
6,035,634 A 3/2000 Tupper et al.
6,065,326 A 5/2000 Frenken
6,126,418 A 10/2000 Sinnl
6,179,063 B1 1/2001 Borries et al.
6,206,663 B1 3/2001 Frenken
6,230,542 B1 5/2001 Frenken
6,266,886 B1 7/2001 Tandart
6,276,186 B1 8/2001 Frenken
6,321,854 B1 11/2001 Bisutti
6,341,950 B1 1/2002 Schuller et al.
6,367,362 B1 4/2002 Brazell et al.
6,378,217 B1 4/2002 Takamura et al.
6,401,345 B1 6/2002 Liaw
6,401,515 B2 6/2002 Frenken
6,446,482 B1 9/2002 Heskey et al.
6,453,719 B1 9/2002 Heskey et al.
6,463,778 B1 10/2002 Johnston
6,510,719 B2 1/2003 Goop
6,532,635 B1 3/2003 Gregory
6,532,790 B2 3/2003 Frenken
6,564,610 B2 5/2003 Lefavour et al.
6,666,064 B2 12/2003 LeFavour et al.
6,668,613 B2 12/2003 Lefavour et al.
6,685,056 B1 2/2004 Argentieri et al.
6,712,726 B1 3/2004 Jackson et al.
6,766,644 B2 7/2004 Vermoesen et al.
6,769,356 B2 8/2004 Frenken
6,772,521 B2 8/2004 Nordlin et al.
6,789,389 B2 9/2004 Nakano
6,826,908 B1 12/2004 Stafford
6,986,274 B2 1/2006 Lefavour et al.
6,990,888 B2 1/2006 Harwath et al.
7,059,337 B2 6/2006 Ball, Jr. et al.
7,086,979 B2 8/2006 Frenken
7,156,190 B2 1/2007 Ottestad et al.
7,251,980 B2 8/2007 Gallentine et al.
7,263,831 B2 9/2007 Sawdon et al.
7,337,514 B2 3/2008 McKay
7,351,176 B1 4/2008 Stafford
7,421,877 B2 9/2008 Frenken
7,428,812 B2 9/2008 Montminy et al.
7,444,813 B1 11/2008 Barvosa-Carter
7,533,556 B2 5/2009 Lefavour et al.
7,568,372 B1 8/2009 Patton et al.
7,661,336 B2 2/2010 Hohmann et al.
7,673,705 B2 3/2010 Gearhart et al.
7,739,871 B2 6/2010 Cotter et al.
7,797,840 B2 9/2010 Bublitz et al.
7,895,837 B2 3/2011 Bass
7,908,963 B2 3/2011 Frenken
7,997,456 B2 8/2011 Shew et al.
8,056,473 B2 11/2011 Frenken
8,276,430 B2 10/2012 Barezzani et al.
8,307,690 B2 11/2012 Cobzaru
2002/0002775 A1 1/2002 Kimura
2004/0113487 A1 6/2004 Yang
2005/0005672 A1 1/2005 Sneath
2005/0276658 A1 12/2005 Silva
2007/0034262 A1 2/2007 Cozens et al.
2008/0087144 A1 4/2008 Rollins et al.
2008/0216543 A1 9/2008 Hamm et al.
2010/0000288 A1 1/2010 Barezzani et al.
2010/0000425 A1 1/2010 Schweizer et al.
2010/0107864 A1 5/2010 Bushner
2010/0132350 A1 6/2010 Hirai
2010/0257713 A1 10/2010 Gregory
2010/0258604 A1 10/2010 Müllner et al.
2010/0300308 A1 12/2010 Frenken
2010/0307010 A1 12/2010 Patton et al.
2011/0048099 A1 3/2011 Cobzaru
2011/0203425 A1 8/2011 Riestra
2011/0247506 A1 10/2011 Frenken

(56) References Cited

U.S. PATENT DOCUMENTS

| | | | |
|---|---|---|---|
| 2011/0315940 | A1 | 12/2011 | Zhong et al. |
| 2012/0160065 | A1 | 6/2012 | Frenken |
| 2013/0206022 | A1 | 8/2013 | Bungter |

OTHER PUBLICATIONS

International Search Report and Written Opinion for Application No. PCT/US2014/061733 dated Jan. 28, 2015 (20 pages).

* cited by examiner

MULTI-OPERATIONAL VALVE

CROSS-REFERENCE TO RELATED APPLICATIONS

This application claims priority to U.S. Provisional Patent Application No. 61/792,356 filed on Mar. 15, 2013, and to U.S. Provisional Patent Application No. 61/677,554 filed on Jul. 31, 2012, the entire contents of both of which are incorporated herein by reference.

FIELD OF THE INVENTION

The present invention relates to fluid valves and, more particularly, to a valve that has multiple modes of operation.

BACKGROUND OF THE INVENTION

Hydraulic systems require the use of valves to regulate, direct, and/or control the flow of fluid throughout the system. In power tools or other hydraulically driven systems, valves are used to direct the flow of fluid to do work, such as by moving a piston within a cylinder or charging a set of actuators. Depending on the desired flow properties, different types of valves are used, each having its own set of abilities and drawbacks.

SUMMARY OF THE INVENTION

The present invention provides, in one aspect, a valve for selectively fluidly communicating a first fluid volume and a second fluid volume. The valve includes a valve body, an inlet orifice in fluid communication with the first fluid volume, and an outlet aperture in fluid communication with the second fluid volume. The valve also includes an activation member axially movable relative to the valve body. The valve is operable in a first mode in which the valve opens in response to manual actuation of the activation member. The valve is operable in a second mode in which the valve opens when a pressure difference between the first and second fluid volumes reaches a predetermined value, and the valve closes when the pressure difference between the first and second fluid volumes is less than the predetermined value.

Other features and aspects of the invention will become apparent by consideration of the following detailed description and accompanying drawings.

Figure 1:
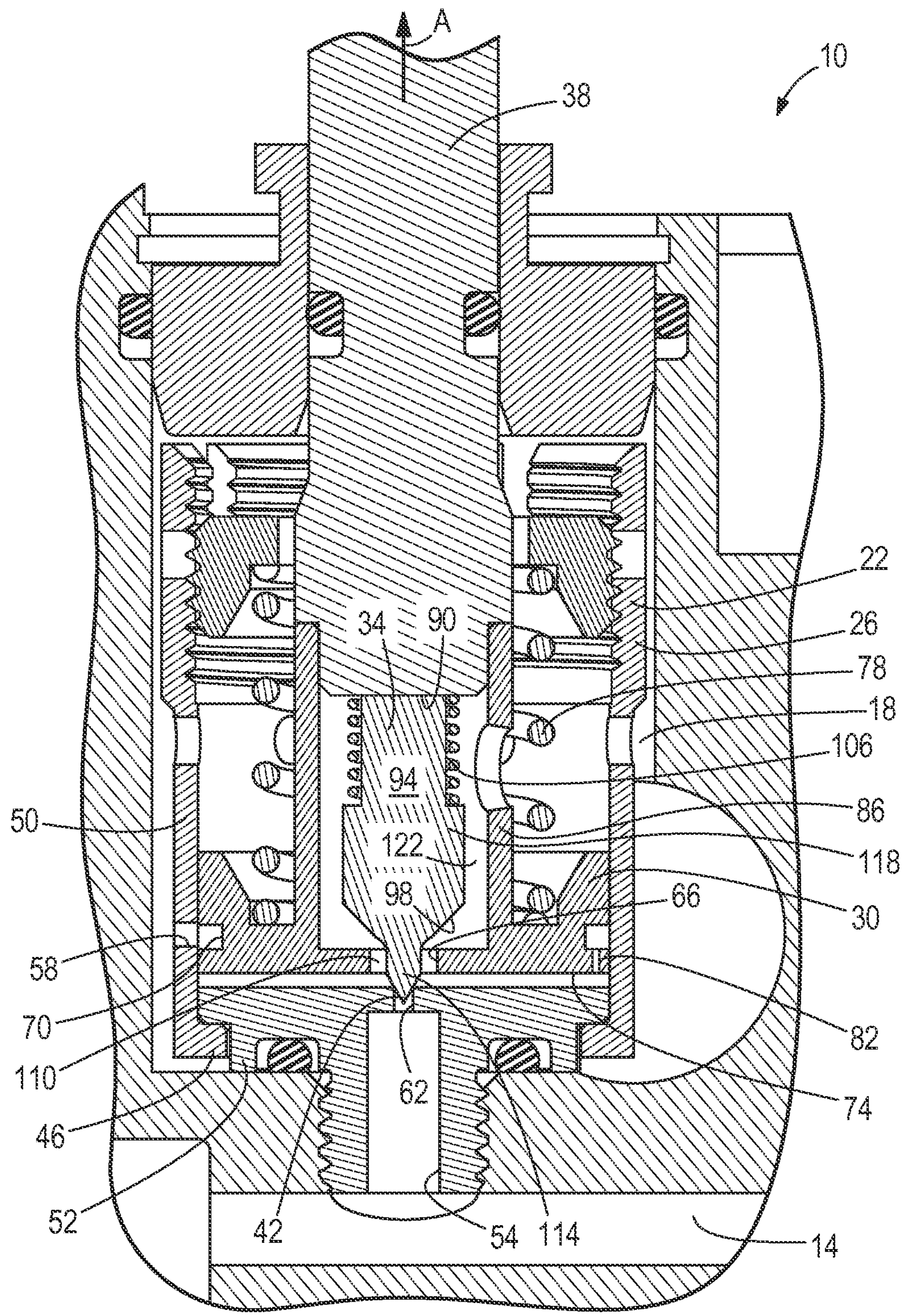
FIG. 1 illustrates a valve according to one construction of the invention in a closed configuration.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-4 illustrate a hydraulic system 10 having a first fluid volume 14 under a first pressure and a second fluid volume 18 under a second pressure, which is lower than the first pressure. The hydraulic system 10 also includes a valve 22 for controlling the flow of fluid between the first fluid volume 14 and the second fluid volume 18. In some constructions, the second fluid volume 18 may include a reservoir.

Although not illustrated, the first fluid volume 14, the second fluid volume 18, or a combination thereof can be utilized in industrial settings to do work. Some examples may include activating a piston, driving a crimping head, driving a cutting head, driving a press, and the like.

Illustrated in FIGS. 1-4, the valve 22 includes a body 26, a first plunger 30, a second plunger 34, an activation rod 38 coupled to the first plunger 30, and a pointed tip 42 located at a distal portion 114 of the second plunger 34. Alternatively, the valve 22 can include a check ball located at the distal portion 114 of the second plunger 34. During operation, the valve 22 is operable in both a manual mode and an automatic mode. During the manual mode (e.g., the valve 22 is opened manually by the user), the valve 22 remains in an open configuration (e.g., allowing fluid to flow from the first fluid volume 14 to the second fluid volume 18) until the pressure of the first fluid volume 14 is substantially equal to the pressure of the second fluid volume 18. In contrast, when the valve 22 is in the automatic mode (e.g., the valve 22 is opened automatically by pressure acting on the pointed tip 42), the valve 22 opens when the pressure difference between the first fluid volume 14 and the second fluid volume 18 exceeds a predetermined value (e.g., 7,600 psi) and closes when the pressure difference drops below said value.

The body 26 of the valve 22 is substantially cylindrical in shape having a base 46 and an annular wall 50 extending axially from the base 46. In the illustrated construction, the valve 22 includes an end cap 52 coupled to the base 46 and defining an input or inlet aperture 54 in fluid communication with the first fluid volume 14. In other constructions, the end cap 52 can be integrally formed with the base 46. Furthermore, the annular wall 50 defines an output or outlet aperture 58 in fluid communication with the second fluid volume 18. The end cap 52 also includes an orifice or seat 62, proximate the input aperture 54, to act as a seat for the pointed tip 42 of the second plunger 34.

The first plunger 30 of the valve 22 is substantially disk shaped and includes a central aperture 66. The first plunger 30 also defines an annular groove 70 about its perimeter. During operation, the plunger 30 moves axially within the body 26 between a first position (FIG. 1), where the plunger 30 is positioned proximate the end cap 52, and a second position (FIG. 3), where the plunger 30 is positioned a distance from the end cap 52. More specifically, when the first plunger 30 is in the first position, a bottom 74 of the plunger 30 is positioned between the end cap 52 and the output aperture 58, at least partially blocking the aperture 58. Furthermore, when the plunger 30 is in the second position, the bottom 74 is above the output aperture 58 leaving the aperture 58 unblocked. In the illustrated construction, the plunger 30 is biased towards the first position by a first spring 78. The first plunger 30 also includes a flow control aperture 82 extending between the bottom 74 and the annular groove 70.

The first plunger 30 also includes a cylindrical wall 86 extending axially therefrom and co-axial with the central aperture 66. When assembled, the cylindrical wall 86 at least partially contains the second plunger 34 therein. The cylindrical wall 86 also acts as a connecting point between the first plunger 30 and the activation rod 38 (described below).

The activation rod 38 is coupled to the first plunger 30 and moves axially therewith. The activation rod 38 includes a distal end (not shown) where the user can manually interact with the valve 22. During operation, the user manually alters the position of the rod 38 with respect to the body 26, causing the first plunger 30 to move between the first and second positions. The activation rod 38 also includes a bottom surface 90 that, when assembled, interacts with the second plunger 34.

The second plunger 34 includes a body 94 having a generally frustoconical contact surface 98 from which the distal portion 114 of the plunger 34 extends. In other constructions, the second plunger 34 can be generally T-shaped, such that the distal portion 114 of the plunger extends generally perpendicular to the contact surface 98. During operation, the second plunger 34 is moveable with respect to the first plunger 30 between a sealed position (FIGS. 2 and 3), where the contact surface 98 forms a seal with the central aperture 66 of the first plunger 30, and an unsealed position (FIGS. 1 and 4), where the contact surface 98 is spaced a distance from the first plunger 30 to allow fluid to flow through the central aperture 66. In the illustrated construction, the second plunger 34 is biased towards the sealed position by a second spring 106.

The distal portion 114 of the second plunger 34 has an outer diameter smaller than a diameter of the central aperture 66. As such, when the valve 22 is assembled, the distal portion 114 of the plunger 34 extends through the central aperture 66 creating a gap 110 therebetween. When the valve 22 is closed, the pointed tip 42 of the distal portion 114 is in engagement with the seat 62 of the end cap 52 to form a seal therewith. In alternate constructions, the distal portion 114 can bear against a check ball or other element to form a seal with the seat 62 of the end cap 52.

The body 94 of the second plunger 34 includes a flange 118 extending axially therefrom proximate the contact surface 98. The flange 118 includes an outer diameter less than the inner diameter of the cylindrical wall 86 to define a gap 122 between the flange 118 and the cylindrical wall 86. In some constructions, the flange 118 can include a notch formed therein and extending axially inwardly to facilitate fluid flow past the flange 118 when the second plunger 34 is in the unsealed position. In the illustrated construction, the cross-sectional area of the gap 122 is greater than the cross-sectional area of the gap 110 between the distal portion 114 and the central aperture 66 to facilitate fluid flow past the flange 118 when the second plunger 34 is in the unsealed position. In other constructions, the cross-sectional area of the gap 122 may be less than or equal to the cross-sectional area of the gap 110.

During operation, the valve 22 generally remains in the closed configuration (FIG. 1) where no fluid can flow between the first hydraulic volume 14 and the second hydraulic volume 18. When the valve 22 is in the closed configuration, the first spring 78 biases the first plunger 30 into the first position while the second spring 106 biases the second plunger 34 towards the input aperture 54 such that the pointed tip 42 is biased into engagement with the seat 62, thereby sealing the input aperture 54 from the first hydraulic volume 14.

To operate the valve 22 in the manual mode, the user manually actuates the activation rod 38 in a first direction A, thereby causing the first plunger 30 to move towards the second position and away from the end cap 52. As the first plunger 30 travels, the pointed tip 42 of the second plunger 34 remains in contact with seat 62, maintaining the seal by way of the biasing force produced by the second spring 106. More specifically, the force produced by the second spring 106 must be great enough to overcome the force acting on the small area of the tip 42 by the first fluid volume 14. As such, the second plunger 34 remains stationary as the first plunger 30 begins to move.

Figure 2:
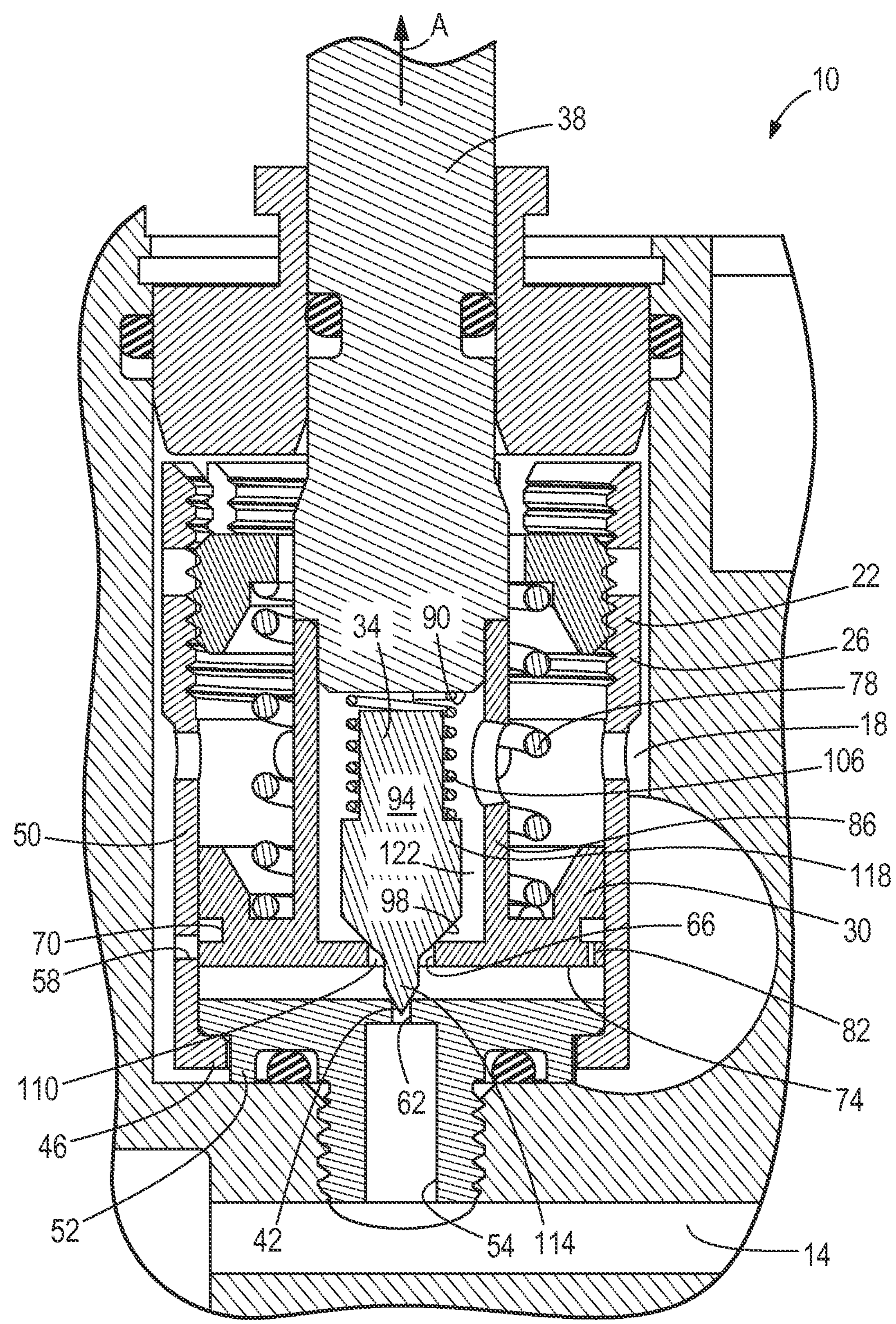
FIG. 2 illustrates the valve of FIG. 1 in an intermediate stage of a manually opened configuration.
Figure 3:
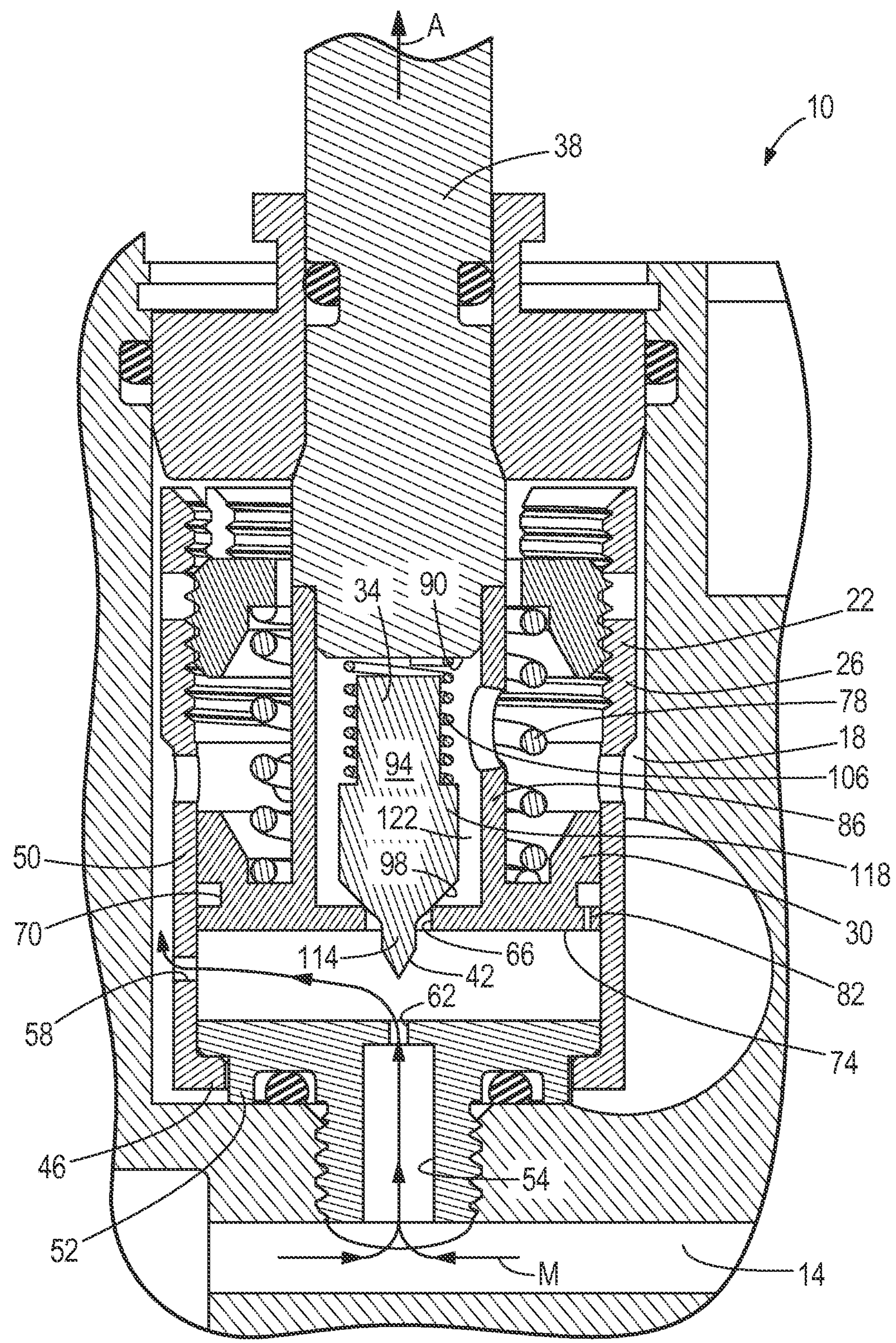
FIG. 3 illustrates the valve of FIG. 1 in a manually opened configuration.

The first plunger 30 continues to move axially with the activation rod 38 until the contact surface 98 of the second plunger 34 contacts the first plunger 30 (FIG. 2). Once this occurs, the second plunger 34 beings moving axially with the first plunger 30 away from the end cap 52 and the force from the second spring 106 maintains the seal between the contact surface 98 and the central aperture 66 of the first plunger 30.

The user continues to move the activation rod 38 in direction A until the first plunger 30 reaches the second position and the tip 42 of the second plunger 34 disengages from the seat 62 allowing fluid from the first fluid volume 14 to flow into the valve 22 through the input aperture 54. Since the central aperture 66 is sealed by the contact surface 98 of the second plunger 34, all the fluid entering the valve 22 flows along path M (FIG. 3), and exits through the output aperture 58 formed in the body 26. Once the valve 22 has been opened in manual mode, the valve 22 will remain in the open configuration (FIG. 3) due to the fluid pressure acting on the bottom surface 74 of the first plunger 30, which has a much greater surface area than the tip 42. The valve 22 remains open until the pressure difference between the first fluid volume 14 and the second fluid volume 18 has nearly reached zero.

As the pressure difference between the first fluid volume 14 and the second fluid volume 18 reduces, the first spring 78 begins to move the first plunger 30 towards the first position. Once the pressure difference has decreased to a given level (e.g., nearly zero), the first plunger 30 will have moved to where it will begin to cover or block the output aperture 58 (FIG. 2). At this time, the aperture 58 becomes aligned with annular groove 70, forcing the working fluid to flow through the flow control aperture 82 formed in first plunger 30. Since the area of the flow control aperture 82 is smaller than the area of the output aperture 58, the speed the fluid able to travel through the valve 22 is reduced.

The reduced fluid movement continues until the pressure difference between the first fluid volume 14 and the second fluid volume 18 has been substantially eliminated and the tip 42 is re-seated, returning the valve 22 to the closed configuration, described above (FIG. 1).

Figure 4:
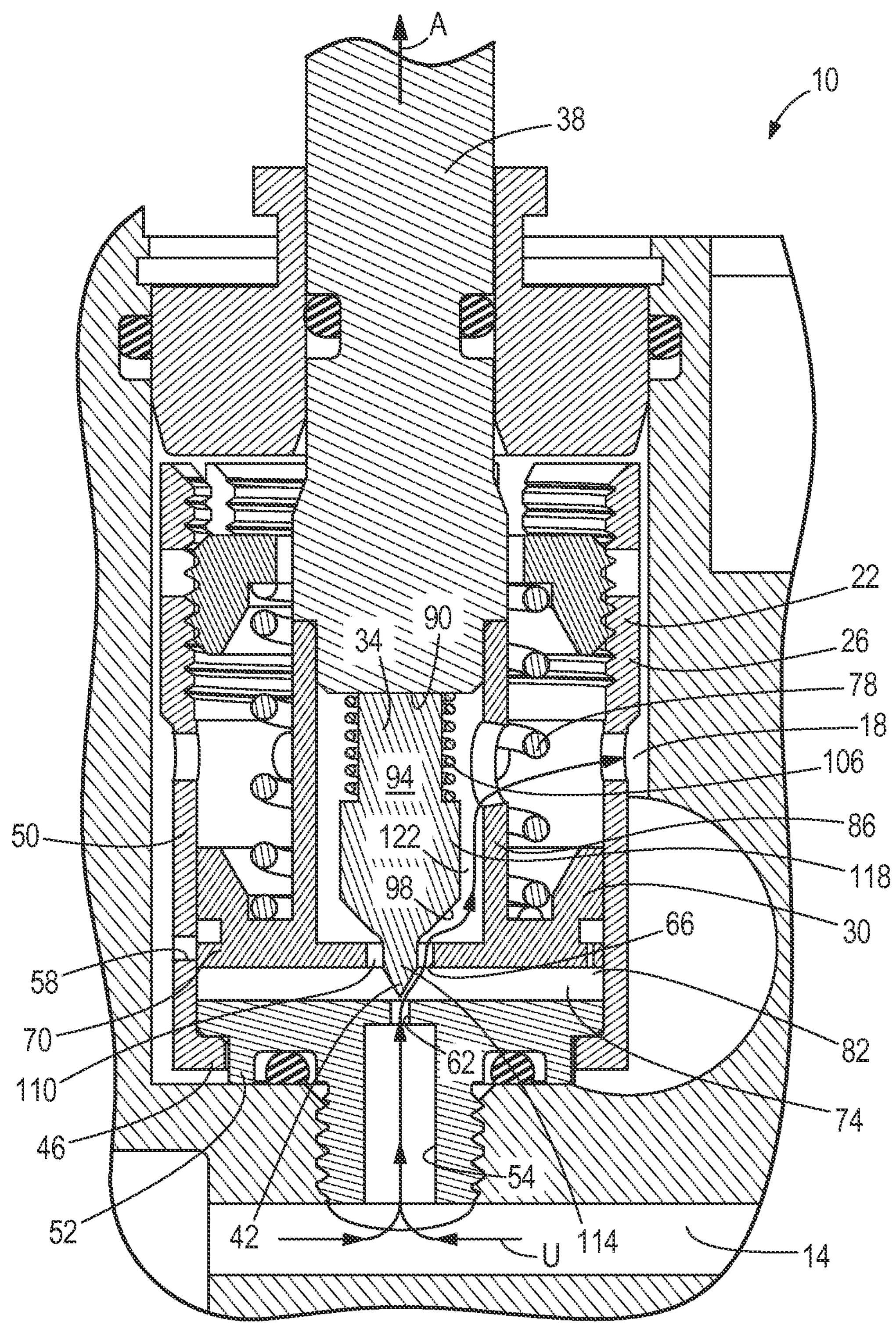
FIG. 4 illustrates the valve of FIG. 1 in an automatically opened configuration.

To operate the valve 22 in the automatic mode, the pressure difference between the first fluid volume 14 and the second fluid volume 18 must exceed a predetermined value (e.g., 7,600 psi). Once the pressure difference has exceeded the predetermined value, hydraulic pressure acting on the small surface area of the tip 42 through the input aperture 54 is great enough to cause the tip 42 to automatically unseat (FIG. 4). The second plunger 34 acts on the bottom surface 90 of the activation rod 38, forcing the first plunger 30 and the activation rod 38 to move together in the direction of arrow A, against the biasing force of the first spring 78. Fluid from the first fluid volume 14 is then allowed to flow into the valve 22 through the input aperture 54.

With continued reference to FIG. 4, since the initial force for opening the valve 22 is exerted on the distal portion 114 of the second plunger 34 instead of on the activation rod 38 as described above, the second plunger 34 is in the unsealed position when the pointed tip 42 is unseated by the fluid pressure. As such, fluid flows along path U through the central aperture 66 to the second fluid volume 18. Because the fluid at least partially bypasses the output aperture 58 and the first plunger 30, there is not enough pressure exerted on the bottom 74 of the first plunger 30 to overcome the first spring 78 and hold the valve 22 open. Therefore, the valve 22 immediately re-closes once the pressure differential between the first fluid volume 14 and the second fluid volume 18 drops below the predetermined value that is required to unseat the pointed tip 42. Stated differently, since the fluid is able to bypass the first plunger 30 (e.g., through the central aperture 66), the valve 22 is not held open by fluid pressure acting on the relatively large surface area of the bottom 74 of the first plunger 30 (as is the case in the manual mode).

Once the pressure differential between the first fluid volume 14 and the second fluid volume 18 has dropped below the predetermined value, the forces from the first and second springs 78, 106 bias the first and second plungers 30, 34 towards the end cap 52. This in turn causes the pointed tip 42 of the second plunger 34 to engage the seat 62. The valve 22 then returns to the closed configuration as described above (FIG. 1).

The relative sizes of the first plunger 30, the second plunger 34, and the tip 42 along with the relative strengths of the first spring 78 and the second spring 106 can be altered to customize the operation of the valve 22. More specifically, the above attributes are altered to determine the predetermined pressure difference needed to automatically open the valve 22, the pressure at which the valve 22 will re-close in manual mode, and the like. For example, in the illustrated construction, the first spring 78 is sufficiently strong to overcome the fluid pressure acting on the small surface area of the tip 42 as pressure builds within the first hydraulic volume 14 (up to the predetermined value). However, the first spring 78 is also sufficiently weak to allow fluid pressure acting on the larger surface area of the bottom 74 of the first plunger 30 hold the valve 22 open once the tip 42 has been manually unseated.

Figure 5:
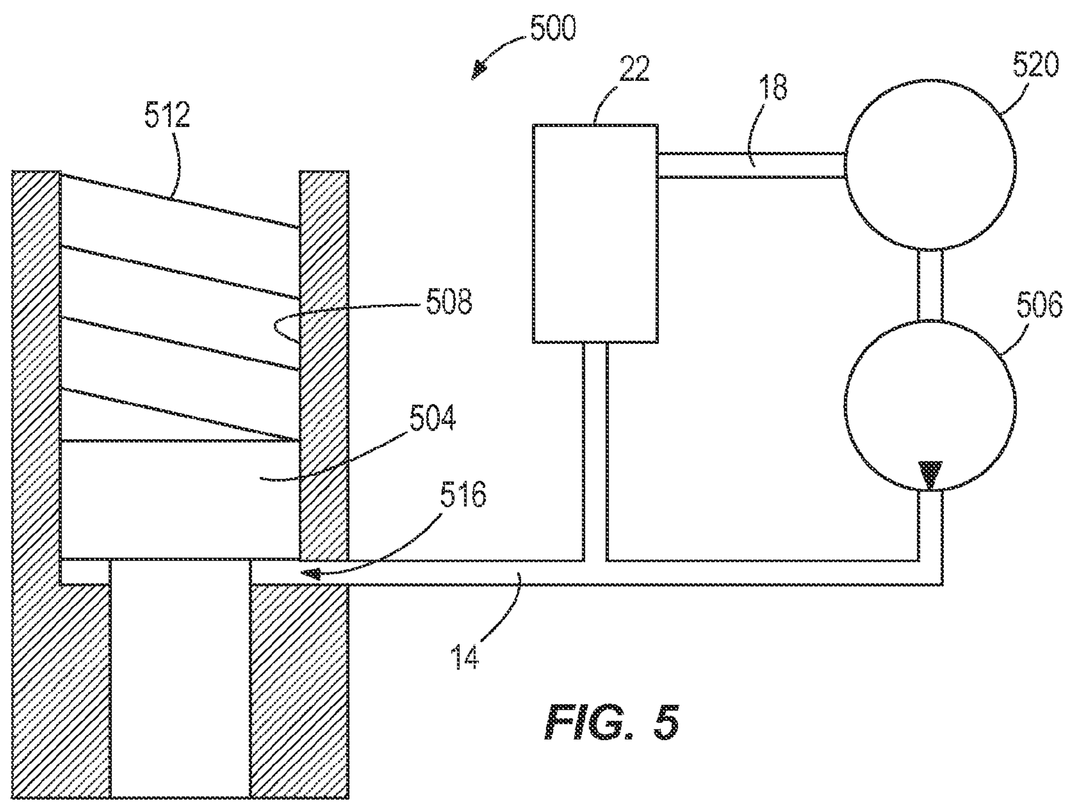
FIGS. 5 and 6 illustrate another hydraulic system containing the valve of FIG. 1.
Figure 6:
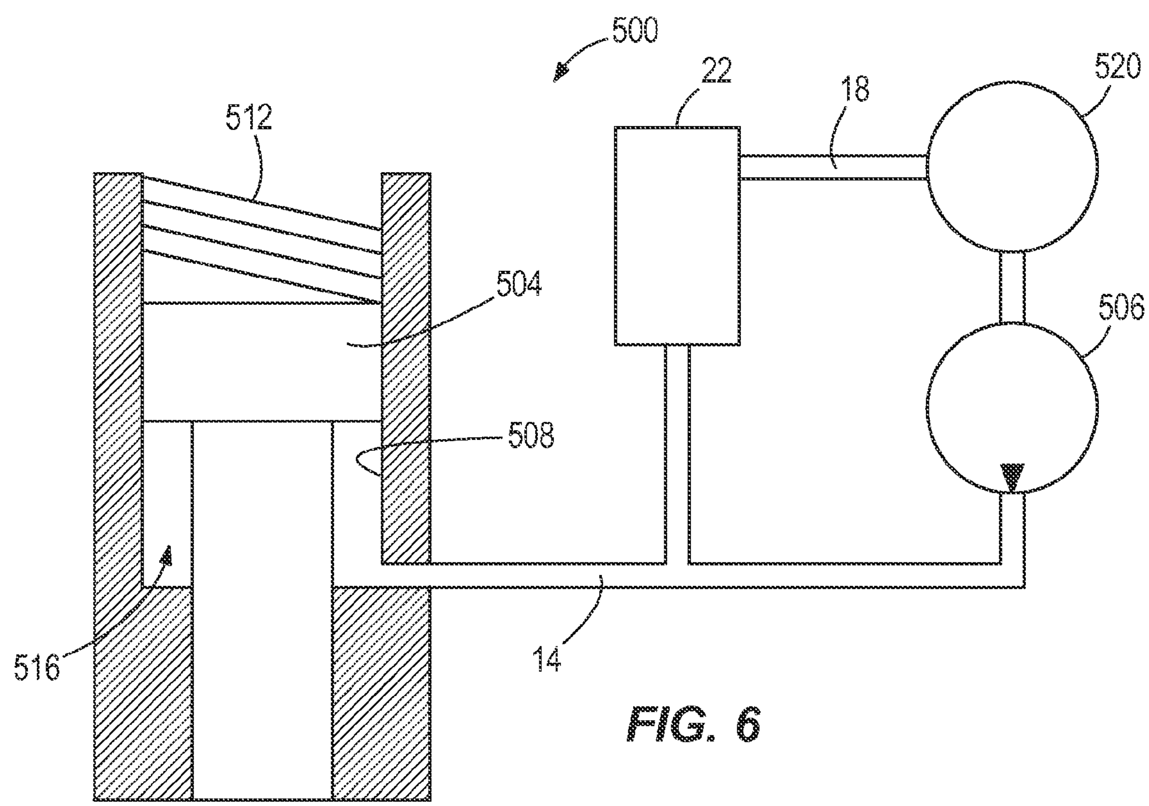

FIGS. 5 and 6 illustrate another construction of a hydraulic system 500 pertaining to a hand held hydraulic tool containing the valve 22 described above. The hydraulic system 500 includes a working piston 504 moveable within a cylinder 508 between a rest position (FIG. 5) and an actuated position (FIG. 6). The hydraulic system 500 also includes a return spring 512 biasing the piston 504 towards the rest position.

In the illustrated construction, the first fluid volume 14 is in fluid communication with the working volume 516 of the device. During operation, a pump 506 draws fluid from a reservoir 520 (e.g., the second fluid volume 18) and pumps fluid, under pressure, into the working volume 516 to bias the working piston 504 towards the actuated position.

Once the piston 504 is in the actuated position, the user may return the piston 504 to the rest position by manually biasing the activating rod 38 and placing the valve 22 in the manual operation mode. Once manually opened, the valve 22 allows fluid to flow from the working volume 516 and into the reservoir 520 (e.g., the fluid flows from the first fluid volume 14 to the second fluid volume 18).

As fluid leaves the work volume 516, the return spring 512 is able to bias the piston 504 toward the rest position. As the piston moves toward the rest position, the pressure of the fluid within the first fluid volume 14 is created by the energy stored within the return spring 512. Therefore, as the piston 504 continues to move toward the rest position, energy is released from the return spring 512 causing the pressure of the fluid in the first fluid volume 14 to drop. As the pressure of the first fluid volume 14 drops, the pressure differential between the first fluid volume 14 and the second fluid volume 18 approaches zero.

Once the pressure within the first fluid volume 14 has decreased to a given level, the first plunger 30 will begin to cover or block the output aperture 58. At this time, the aperture 58 becomes aligned with annular groove 70 forcing the working fluid to flow through the flow control aperture 82 formed in the bottom of the first plunger 30. Since the area of the flow control aperture 82 is smaller than the area of the output aperture 58, the speed the fluid able to leave the work volume 516 is reduced and the speed of the piston 504 returning to the rest position is slowed. This feature also allows the piston 504 to more fully return to the rest position since movement within the cylinder 508 is still permitted until the pointed tip 42 is fully seated.

The reduced speed movement of the piston 504 continues until the piston 504 has successfully returned to the rest position, at which time the valve 22 will return to the closed configuration, as described above.

In instances where operating pressures within the work volume 516 exceed the pressure within the reservoir 520 beyond the predetermined value (e.g., if the piston 504 becomes jammed or the user attempts to cut material beyond the specifications of the device) the valve 22 will enter the automatic operation mode. During this mode, the valve 22 will open, as described above, to allow fluid in the work volume 516 to flow into the reservoir 520 until the pressure difference between work volume 516 and the reservoir 520 falls below the predetermined value. Once the pressure differential is low enough, the valve 22 will close as described above.

Therefore, the piston 504 will only travel a short distance within the cylinder 508, less than the total distance between the actuated position and the rest position. Note the piston 504 will not automatically return all the way to the rest position as was the case during the manual actuation of the valve 22.

Although the construction illustrated in FIGS. 5 and 6 is shown driving a piston within a cylinder, in other constructions the valve 22 can be installed in alternate, portable hydraulic power tools such as power crimpers and hydraulic press tools.

Figure 7:
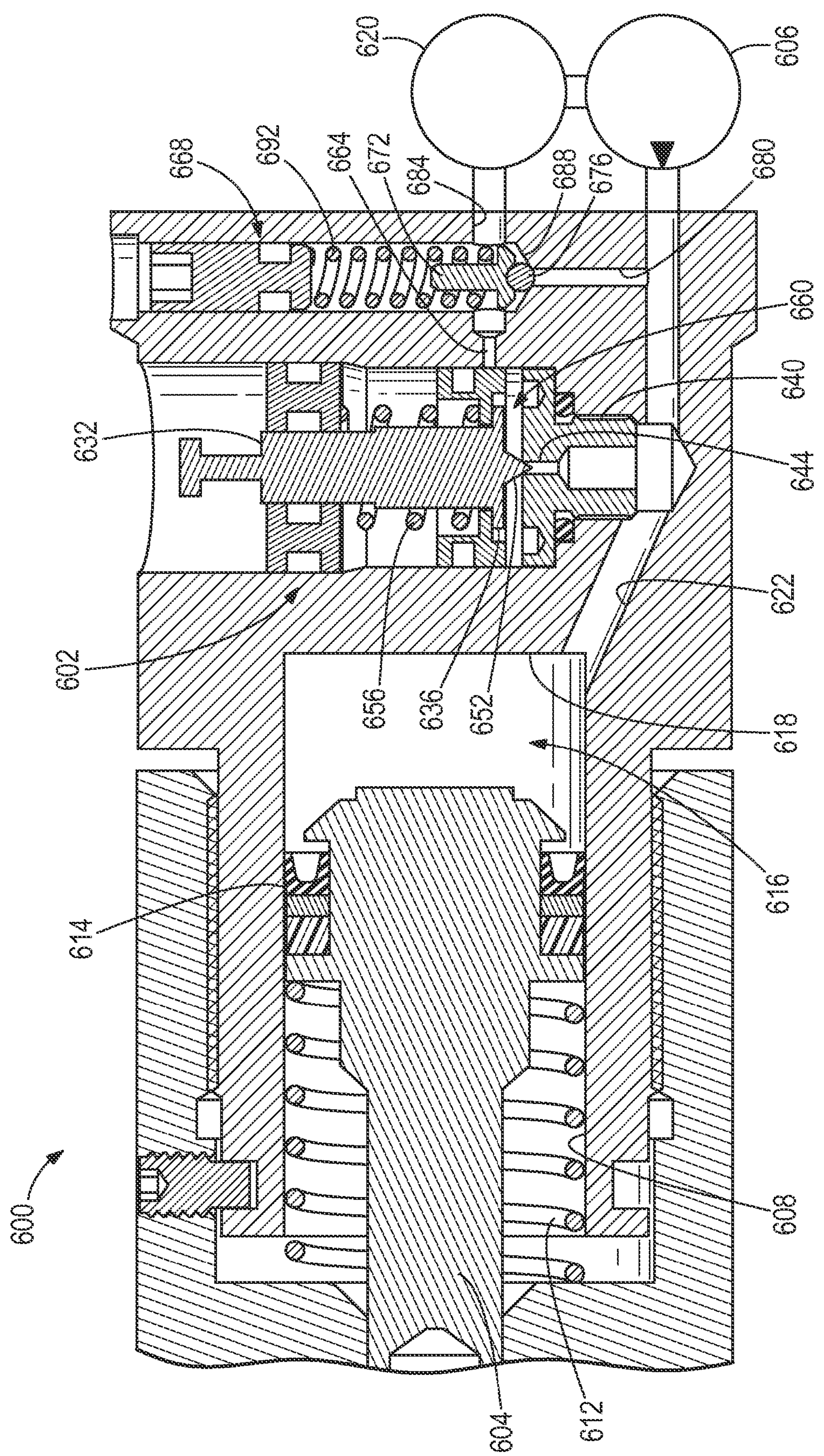
FIG. 7 illustrates a valve according to another construction of the invention in a closed configuration.
Figure 8:
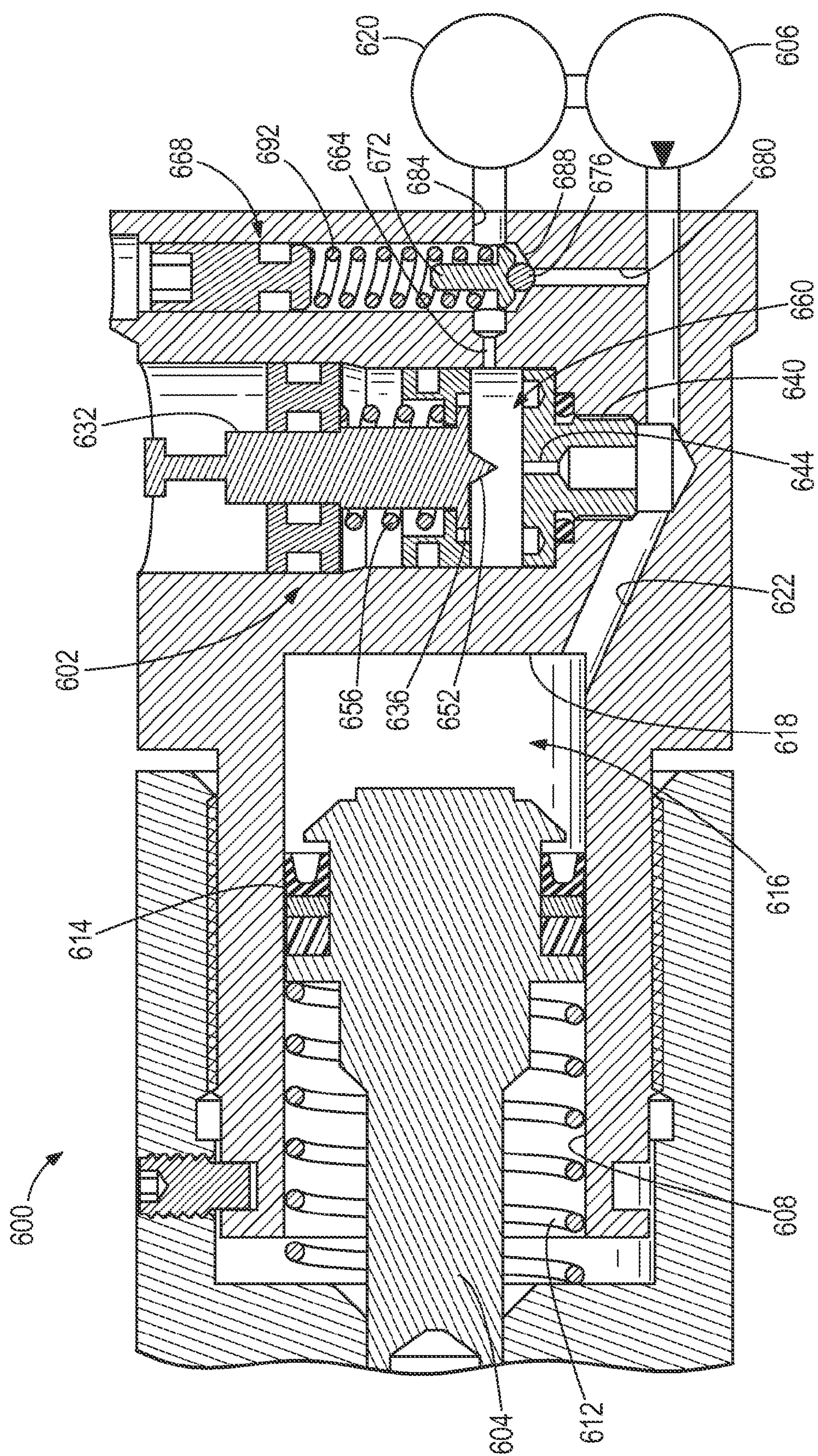
FIG. 8 illustrates the valve of FIG. 7 in an open configuration.

FIGS. 7 and 8 illustrate another construction of a hydraulic system 600 pertaining to a hand held hydraulic tool and containing a valve 602 according to another construction of the invention. The hydraulic system 600 includes a working piston or ram 604 moveable within a cylindrical ram chamber 608 between a rest position and an actuated position. The ram 604 is operably coupled to a working element (not shown), such as a crimping head, a cutting head, a press, and the like. The hydraulic system 600 also includes a return spring 612 biasing the ram 604 towards the rest position.

In the illustrated construction, the ram 604 includes a disk-shaped sealing member 614 that creates a substantially fluid-tight seal with the ram chamber 608. The sealing member 614 defines a working volume 616, disposed between the sealing member 614 and a proximal wall 618 of the ram chamber 608. During operation, a pump 606 draws fluid from a reservoir 620 and pumps fluid, under pressure, through a supply passage 622 and into the working volume 616 to bias the ram 604 towards the actuated position.

The valve 602 includes a valve stem 632 having a poppet 636 located at a distal end of the valve stem 632, and a valve seat 640 having a passage 644 extending through the valve seat 640. The passage 644 is in fluid communication with the supply passage 622 and working volume 616 of the ram chamber 608. The poppet 636 includes a pointed tip 652 configured to substantially seal the passage 644 when the valve 602 is in a closed configuration (FIG. 7).

The valve stem 632 is axially moveable to define the closed configuration (FIG. 7) and an open configuration (FIG. 8) of the valve 602. The valve stem 632 is biased towards the closed configuration by a spring 656 (best illustrated in FIG. 8). As the ram 604 moves from the rest position toward the actuated position, against the biasing force of the return spring 612 and against any load applied to the working element, fluid pressure builds within the working volume 616. This fluid pressure also pushes against the tip 652 of the poppet 636, against the biasing force of the spring 656. In the illustrated construction, the valve 602 functions as a manual-release valve and includes an actuator (not shown) operable by the user to move the valve 602 toward the open configuration. Since the area of the tip 652 exposed to the fluid pressure of the working volume 616 is relatively small, during normal operation of the hydraulic system 600, the valve 602 remains in the closed configuration until actuated by the user.

As the user operates the actuator, the valve 602 moves toward the open configuration. The seal between the tip 652 and the passage is broken, and fluid from the working volume 616 flows into a valve chamber 660 defined between the valve seat 640 and the poppet 636. The fluid flowing into the valve chamber 660 presses against the face of the poppet 636, and the fluid is able to overcome the biasing force of the spring 656 because the surface area of the poppet 636 is much greater than the surface area of the tip 652. Therefore, once the valve 602 is opened by the user, the fluid pressure acting on the poppet 636 causes the valve 602 to remain in the open configuration without requiring additional input from the user.

The valve 602 includes an orifice 664 in fluid communication with the valve chamber 660 when the valve 602 is in the open configuration (FIG. 8). The orifice 664 allows fluid from the valve chamber 660 to return to the reservoir 620 of the hydraulic system 600. In the illustrated construction, the hydraulic system 600 includes a secondary valve 668, which will be described in further detail below, disposed between the orifice 664 and the reservoir 620. However, the secondary valve 668 does not substantially affect fluid flow from the orifice 664 to the reservoir 620. In other constructions, the secondary valve 668 can be omitted. As the fluid flows from the working volume 616, into the valve chamber 660, and out through the orifice 664, the ram 604 moves toward the rest position under the biasing force of the return spring 612. The restrictiveness (i.e., the cross-sectional area) of the orifice 664 can be selected to provide a desired speed and pressure at which the ram 604 returns toward the rest position.

As the ram 604 moves toward the rest position, the pressure of the fluid within the working volume 616 is created by the energy stored within the return spring 612. Therefore, as the ram 604 continues to move toward the rest position, energy is released from the return spring 612 causing the pressure of the fluid in the working volume 616 to drop. Once the ram 604 has reached a predetermined position (e.g., the rest or returned position in one construction), the pressure within the working volume 616 (and therefore the valve chamber 660) falls below the pressure required to hold the valve 602 in the open position, against the biasing force of the spring 656. The tip 652 of the poppet 636 then blocks the passage 644 of the valve seat, putting the valve 602 in the closed configuration (FIG. 7).

The secondary valve 668 includes a plunger 672 having a check ball 676 located at a distal end of the plunger 672. The secondary valve 668 also includes an inlet passage 680 in fluid communication with the supply passage 622, and an outlet passage 684 in fluid communication with the reservoir 620. The inlet passage 680 includes a valve seat 688 shaped to receive the check ball 676 in order to substantially seal the inlet passage 680 when the secondary valve 668 is in a closed configuration (as illustrated in FIGS. 7 and 8). The plunger 672 is axially moveable to define the closed configuration and an open configuration (not shown) of the valve secondary valve 668. The plunger 672 is biased towards the closed configuration by a spring 692.

The relative sizes of the poppet 636 and the check ball 676 along with the relative strengths of the spring 656 and the spring 692 can be altered to customize the operation of the hydraulic system 600. Several examples of possible operation modes are described in detail below.

In a first operation mode of the hydraulic system 600, the valve 602 is configured to move from the closed configuration (FIG. 7) to the open configuration (FIG. 8) in response to a user input. Once the valve 602 is initially opened, the fluid pressure bearing against the face of the poppet 636 holds the valve 602 in the open configuration, and the fluid from the working volume 616 flows through the passage 644, into the valve chamber 660, and through the orifice 664. The fluid then flows around the plunger 672 of the secondary valve 668, through the outlet passage 684, and finally into the reservoir 620. As the fluid flows out of the working volume 616, the return spring 612 pushes the ram 604 toward the rest position. When the ram 604 arrives at the rest position, the pressure within the working volume 616 is low enough that the valve 602 moves to the closed configuration. Thus, in the first operation mode, the valve 602 is configured to return the ram 604 fully to the rest position once actuated by the user.

In the first operation mode, the secondary valve 668 functions as a pressure release valve. As such, the check ball 676 only unseats from the valve seat 688 if the pressure within the working volume 616 exceeds a predetermined maximum pressure. For example, if the pressure within the working volume 616 builds suddenly (e.g., if the ram 604 becomes jammed) and the user does not immediately actuate the valve 602, the pressure acting on the check ball 676 overcomes the biasing force of the spring 692, allowing fluid to flow from the working volume 616 through the inlet passage 680, then through the outlet passage 684 and into the reservoir 620. Once the pressure of the working volume 616 falls below the predetermined pressure, the spring 692 forces the secondary valve 668 closed, reseating the check ball 676 on the valve seat 688.

In a second operation mode of the hydraulic system 600, the secondary valve 668 is configured to automatically return the ram 604 toward the rest position, without requiring input from the user. When the pressure within the working volume 616 reaches a predetermined pressure (e.g., when the ram 604 reaches the actuated position and/or when the ram 604 experiences a predetermined maximum load at any point during the stroke of the ram 604), the pressure acting on the check ball 676 overcomes the biasing force of the spring 692, allowing fluid to flow from the working volume 616 through the inlet passage 680, then through the outlet passage 684 and into the reservoir 620. As the fluid flows out of the working volume 616, the ram 604 moves toward the rest position, and the pressure within the working volume 616 decreases. The plunger 672 of the secondary valve 668 can include a face area greater than the area of the check ball 676, similar to the relationship between the tip 652 and the poppet 636 of the valve 602 described previously. Alternatively, the second valve 668 can include a pointed tip in place of the check ball 676, similar to the tip 652 of the valve 602. Accordingly, once the secondary valve 668 opens, ram 604 returns toward the rest position until the pressure within the working volume 616 drops to a closing pressure of the valve 668.

In one construction, the secondary valve 668 is configured to move to the closed configuration at a pressure of the working volume 616 corresponding with the ram 604 reaching the rest position. In this construction, the ram 604 is fully returned to the rest position without requiring any input from the user (i.e., the user is not required to actuate the valve 602). In another construction, the secondary valve 668 is configured to move to the closed configuration at an intermediate position of the ram 604 (i.e., prior to the ram 604 reaching the rest position). In this construction, if desired, the ram 604 can be advanced toward the actuated position (e.g., to perform a work operation) from the intermediate position, or the user can actuate the valve 602 to return the ram 604 fully to the rest position.

In other constructions, the hydraulic system 600 can include additional mechanical or electronic control arrangements to provide additional operating modes, as may be desired.

Various features of the invention are set forth in the following claims.

What is claimed is:

1. A valve for selectively fluidly communicating a first fluid volume and a second fluid volume, the valve comprising:
- a valve body;
- an inlet orifice in fluid communication with the first fluid volume;
- an outlet aperture in fluid communication with the second fluid volume;
- an activation member axially movable relative to the valve body;
- a first plunger axially movable within the body, the first plunger including a central aperture that provides a fluid flow path between the first and second fluid volumes;
- a second plunger including a contact surface, the second plunger being axially movable relative to the first plunger between a sealed position in which the contact surface engages the central aperture to form a seal with the central aperture that prevents fluid flow through the central aperture, and an unsealed position in which the contact surface is spaced from the central aperture to permit fluid flow through the central aperture; and
- a biasing member that biases the second plunger toward the sealed position,
- wherein the valve is operable in a first mode in which the valve opens in response to manual actuation of the activation member, and
- wherein the valve is operable in a second mode in which the valve opens when a pressure difference between the first and second fluid volumes reaches a predetermined value, and the valve closes when the pressure difference between the first and second fluid volumes is less than the predetermined value.

2. The valve of claim 1, wherein a distal portion of the second plunger forms a seal with the inlet orifice when the valve is closed, and wherein the distal portion is spaced from the inlet orifice when the valve is open.

3. The valve of claim 2, wherein the first plunger is movable between a first position in which a portion of the first plunger at least partially blocks the outlet aperture to inhibit fluid flow through the outlet aperture and a second position in which the outlet aperture is unblocked to permit substantially unimpeded fluid flow through the outlet aperture.

4. The valve of claim 3, wherein, in the first mode, the first plunger is axially movable independently of the second plunger as the first plunger moves from the first position to an intermediate position between the first position and the second position, and wherein the second plunger is axially movable with the first plunger as the first plunger moves from the intermediate position toward the second position.

5. The valve of claim 4, wherein a periphery of the central aperture bears against the contact surface of the second plunger to move the second plunger with the first plunger as the first plunger moves from the intermediate position toward the second position.

6. The valve of claim 3, wherein the biasing member that biases the second plunger is a second biasing member, and wherein the valve further includes a first biasing member that biases the first plunger toward the first position.

7. The valve of claim 1, wherein the first plunger is coupled to the activation member for axial movement with the activation member.

8. The valve of claim 1, wherein a distal portion of the second plunger forms a seal with the inlet orifice when the valve is closed, and wherein the distal portion is spaced from the inlet orifice when the valve is open.

9. The valve of claim 8, wherein the distal portion of the second plunger includes a pointed tip.

10. The valve of claim 1, wherein the first plunger includes a hollow, cylindrical portion, and wherein the second plunger is at least partially received within the cylindrical portion.

11. The valve of claim 10, wherein the distal portion of the second plunger extends through the central aperture of the first plunger, and wherein a gap is defined between the distal portion and the central aperture.

12. The valve of claim 11, wherein the gap is a first gap, wherein the second plunger includes a body disposed within the cylindrical portion of the first plunger, and wherein a second gap is defined between the body and the cylindrical portion.

13. The valve of claim 1, wherein the predetermined value is about 7,600 psi.

14. The valve of claim 1, wherein, in the second mode, the valve closes as soon as the pressure difference between the first and second fluid volumes drops below the predetermined value.

15. The valve of claim 1, wherein, in the first mode, when the valve is opened in response to manual actuation of the activation member, the valve remains open until the pressure difference between the first and second fluid volumes is substantially zero.

16. A valve for selectively fluidly communicating a first fluid volume and a second fluid volume, the valve comprising:
- a valve body;
- an inlet orifice in fluid communication with the first fluid volume;
- an outlet aperture in fluid communication with the second fluid volume;
- an activation member axially movable relative to the valve body;
- a first plunger axially movable within the body, the first plunger including a central aperture that provides a fluid flow path between the first and second fluid volumes; and
- a second plunger at least partially received within a hollow cylindrical portion of the first plunger, the second plunger including a distal portion extending through the central aperture to define a gap therebetween, the second plunger being axially movable relative to the first plunger, wherein the valve is operable in a first mode in which the valve opens in response to manual actuation of the activation member, and wherein the valve is operable in a second mode in which the valve opens when a pressure difference between the first and second fluid volumes reaches a predetermined value, and the valve closes when the pressure difference between the first and second fluid volumes is less than the predetermined value.

17. The valve of claim 16, wherein the second plunger includes a contact surface, and wherein the second plunger is axially movable relative to the first plunger between a sealed position in which the contact surface engages the central aperture to form a seal with the central aperture that prevents fluid flow through the central aperture, and an unsealed position in which the contact surface is spaced from the central aperture to permit fluid flow through the central aperture.

18. The valve of claim 17, wherein the valve further includes a biasing member that biases the second plunger toward the sealed position.

19. A valve for selectively fluidly communicating a first fluid volume and a second fluid volume, the valve comprising:

a valve body;

an inlet orifice in fluid communication with the first fluid volume;

an outlet aperture in fluid communication with the second fluid volume;

an activation member axially movable relative to the valve body;

a first plunger axially movable within the body between a first position in which a portion of the first plunger at least partially blocks the outlet aperture to inhibit fluid from flowing between the first and second fluid volumes through the outlet aperture and a second position in which the outlet aperture is unblocked to permit substantially unimpeded fluid flow between the first and second fluid volumes through the outlet aperture, the first plunger including a central aperture that provides a fluid flow path between the first and second fluid volumes; and a second plunger including a contact surface, the second plunger being axially movable relative to the first plunger between a sealed position in which the contact surface engages the central aperture to form a seal with the central aperture and prevent fluid flow through the central aperture, and an unsealed position in which the contact surface is spaced from the central aperture to permit fluid flow through the central aperture, wherein the valve is operable in a first mode in which the valve opens in response to manual actuation of the activation member, wherein the valve is operable in a second mode in which the valve opens when a pressure difference between the first and second fluid volumes reaches a predetermined value, and the valve closes when the pressure difference between the first and second fluid volumes is less than the predetermined value, wherein, in the first mode, the first plunger is axially movable independently of the second plunger member as the first plunger moves from the first position to an intermediate position between the first position and the second position, and wherein the second plunger is axially movable with the first plunger as the first plunger moves from the intermediate position toward the second position.

* * * * *